No. 809,409. PATENTED JAN. 9, 1906.
P. W. TILLINGHAST.
PNEUMATIC TIRE.
APPLICATION FILED MAR. 5, 1903.
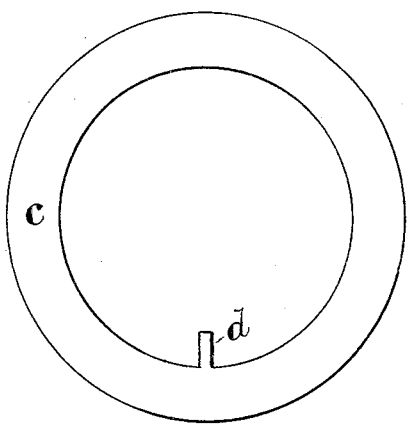
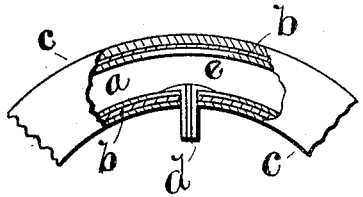 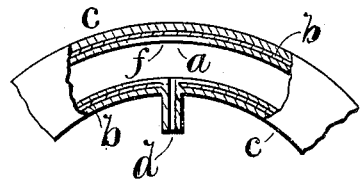
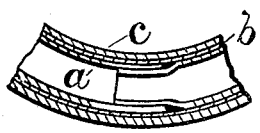 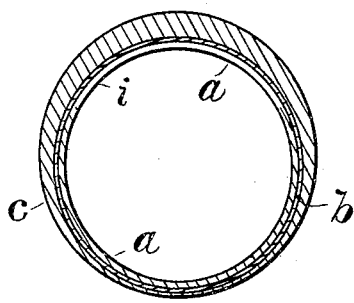 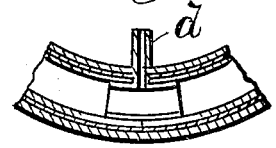
Witnesses
Inventor

UNITED STATES PATENT OFFICE.

PARDON W. TILLINGHAST, OF EDGEWOOD, RHODE ISLAND.

PNEUMATIC TIRE.

No. 809,409.           Specification of Letters Patent.           Patented Jan. 9, 1906.

Application filed March 5, 1903. Serial No. 146,396.

*To all whom it may concern:*

Be it known that I, PARDON W. TILLINGHAST, a citizen of the United States, residing at Edgewood, a suburb of the city of Providence, in the county of Providence and State of Rhode Island, have invented a new and useful Improvement in Pneumatic Tires, of which the following is a specification.

In tires of the so-called "single-tube" type more or less difficulty is experienced in making certain repairs; and it is the object of my present invention to make a tire that can be more easily repaired in case of injury.

Although my preferred construction departs somewhat from the present tires now in general use on bicycles and automobiles, I may, however, retain the characteristic feature of the single-tube structure.

I accomplish my object as hereinafter described.

Figure 1 shows the complete tire; Figs. 2, 3, 4, and 5, short sectional views, and Fig. 6 a cross-sectional view.

Similar letters of reference refer to similar parts throughout the several views.

Referring now to the drawings, $a$ is the air-tube, which may be made wholly or in part of unsulfurized caoutchouc—*i. e.*, caoutchouc in which sulfur or other vulcanizing agent has not been incorporated.

$b$ is the fabric that intervenes between the air-tube $a$ and the outer covering of rubber $c$.

One common source of trouble with single-tube tires is carelessness in cementing tires to the wheel-rim, allowing them to loosen quickly, and before the rider realizes the danger his tire has crept on the rim and torn off the valve-stem. This requires a repair by vulcanization—that is, to insure a proper repair a new stem $d$ must be inserted into the air-tube $a$ and the enlarged end $e$ of said stem vulcanized to the inside surface of the air-tube $a$, as shown in Fig. 2, and such repair can be more easily and positively made if the air-tube $a$, or at least that portion operated upon, has not been previously vulcanized.

What has been said concerning the ease of repairing an injury to the valve-stem would also be true regarding the vulcanization of other repairs, such as cuts or punctures, or making repairs in other parts of the tire by cementing without resorting to vulcanization if the whole air-tube was made of unsulfurized caoutchouc. An air-tube so made would not as a whole cure or vulcanize, particularly on its interior surface, where it is out of contact with other caoutchouc in which has been mixed powdered sulfur or its equivalent.

It is well known that unsulfurized caoutchouc, that in itself is unvulcanizable, will be vulcanized to sulfurized or vulcanizable caoutchouc when the two are brought into contact and subjected to heat. Enough of the melted sulfur during the heat is absorbed or otherwise taken up by the unsulfurized caoutchouc from that which has been sulfurized to permit a thorough vulcanized union of the two. The vulcanization may not extend into the mass of unsulfurized caoutchouc any great depth; but the original surface will be found integral with that which has been sulfurized and will resist all attempts at separation on said original surface-line, but may be separated at some other point in its mass removed from the influence of sulfur, one of the vulcanizing agents of rubber, as if it had not been subjected to heat. Experience also teaches that where caoutchouc is exposed to the atmosphere the surface soon loses its adhesive properties. For this reason it is customary to keep all stock in sheet form rolled in sheets or strips of cloth. I take advantage of the non-adhesive nature of such surface after exposure to lessen or entirely dispense with the usual method of rendering caoutchouc non-adhesive—*i. e.*, by means of an application of dry powder—and manufacture the air-tube $a$ of unvulcanizing stock treated in the above manner and preferably omitting the usual cementing together of the tube and next adjoining material. The action of the heat upon the tube during the vulcanizing process tends to dry the material, and thereby, together with the prior exposure, renders it substantially non-adhesive. An application of a suitable solvent will, however, transform this caoutchouc into a viscous material at the desired point. I may make the tube in the form of an annulus before applying the outer coverings or form the tire in a straight piece and afterward unite the ends. The tire is then ready to be subjected to heat preferably in a mold, during which process the fabric $b$ and caoutchouc $c$, forming the covering for the air-tube $a$, are united by vulcanization over and around the tube $a$, which remains uncured after the removal of the tire from the heat.

If during the manufacture no powder or cement has been used on the surface of the tube, enough of its inherent adhesive nature will be evidenced during the heat to cement it more or less firmly to the surface next adjoining, although it will not weld therewith into an inseparable or integral mass.

For the purpose of repair a little naphtha or other solvent of caoutchouc applied at the point of injury will prepare the tube by restoring its adhesive properties at the desired location and if the injury is slight will be sufficient to cause the torn edges of the caoutchouc to unite.

The above treatment in the manufacture of air-tubes is sufficient to prevent the accidental sticking together of its inner walls.

Instead of making the air-tube wholly of unvulcanizing caoutchouc I may form the tube with one or more short sections *f a* of such material, as shown in Fig. 3, and I may also form the tube with a longitudinal strip *i a* of like material along the tread or most vulnerable part of the tire, as shown in Fig, 6, or I may make the air-tube with unvulcanizing tips, as shown in Figs. 4 and 5. The parts of the tube shown without section-lines in the several views represent unvulcanizing caoutchouc.

What I claim as my invention, and desire to secure by Letters Patent, is—

1. A pneumatic tire, having an air-tube constructed of caoutchouc the surfaces of which are rendered non-viscous and unvulcanizing for the purpose of facilitating repairs.

2. A pneumatic tire including an unsulfurized atmospherically-treated air-tube said air treatment being for the purpose of rendering the surface of said tube non-viscous, an outer covering of vulcanized rubber and a ply or plies of fabric between the said covering and the tube.

3. A pneumatic tire including an air-tube, an outer tube of rubber and a ply or plies of fabric, said air-tube having its overlapping joints and parts made of unsulfurized caoutchouc and having its exposed surface atmospherically treated to facilitate repairs.

4. A pneumatic tire composed of the following elements, an unsulfurized, atmospherically-treated air-tube said treatment being for the purpose of rendering non-viscous the surfaces only of said tube for the purpose of facilitating repairs means connected to said tube whereby air may be supplied to the same, an outer covering of vulcanizable rubber a ply or plies of fabric which together with said covering is vulcanized into an integral mass inclosing said air-tube.

In testimony whereof I have signed my name to this specification in the presence of two subscribing witnesses.

PARDON W. TILLINGHAST.

Witnesses:
A. L. BURDICK,
HERBERT M. BRIGGS.